(12) United States Patent
Moth

(10) Patent No.: US 9,300,171 B2
(45) Date of Patent: Mar. 29, 2016

(54) EMERGENCY POWER SUPPLY APPARATUS

(75) Inventor: Klaus Moth, Kolding (DK)

(73) Assignee: LEANECO APS, KOLDING (DK)

( * ) Notice: Subject to any disclaimer, the term of this patent is extended or adjusted under 35 U.S.C. 154(b) by 1002 days.

(21) Appl. No.: 13/122,038

(22) PCT Filed: Oct. 1, 2009

(86) PCT No.: PCT/IB2009/007118
§ 371 (c)(1),
(2), (4) Date: Mar. 31, 2011

(87) PCT Pub. No.: WO2010/038152
PCT Pub. Date: Apr. 8, 2010

(65) Prior Publication Data
US 2011/0187197 A1    Aug. 4, 2011

(30) Foreign Application Priority Data
Oct. 3, 2008    (GB) .................................. 0818174.5

(51) Int. Cl.
H02J 9/06    (2006.01)

(52) U.S. Cl.
CPC .................. *H02J 9/062* (2013.01); *Y02B 10/72* (2013.01); *Y10T 307/625* (2015.04)

(58) Field of Classification Search
None
See application file for complete search history.

(56) References Cited

U.S. PATENT DOCUMENTS

| | | | |
|---|---|---|---|
| 5,532,525 A * | 7/1996 | Kaiser et al. ..................... | 307/64 |
| 5,939,798 A * | 8/1999 | Miller ............................. | 307/64 |
| 6,465,910 B2 | 10/2002 | Young | |
| 7,155,320 B2 | 12/2006 | Gee | |
| 2001/0011845 A1 | 8/2001 | Simonelli et al. | |
| 2004/0070279 A1 | 4/2004 | Liu | |
| 2005/0012395 A1 | 1/2005 | Eckroad et al. | |
| 2005/0043859 A1 | 2/2005 | Tsai et al. | |
| 2006/0167569 A1 | 7/2006 | Colombi et al. | |

(Continued)

FOREIGN PATENT DOCUMENTS

| | | |
|---|---|---|
| CA | 2508728 A1 | 6/2004 |
| CN | 101136557 A | 3/2008 |
| EP | 0575101 A2 | 12/1993 |
| EP | 0696831 A2 | 2/1996 |

(Continued)

OTHER PUBLICATIONS

PCT International Preliminary Report on Patentability for PCT/IB2009/007118 issued on Apr. 5, 2011.

*Primary Examiner* — Jared Fureman
*Assistant Examiner* — Aqeel Bukhari
(74) *Attorney, Agent, or Firm* — Troutman Sanders LLP

(57) ABSTRACT

A modular emergency power system architecture (200) with a plurality of output power supply lines for feeding power to a destination, in which the operational status of each output power supply line is configurable. The architecture comprises a plurality of load bars (208, 209) from which power is delivered to the destination. The load bars (208, 209) are selectively connectable to send power to or receive AC power from a mains supply (202) and/or a DC bus (210) via one or more AC/DC power conversion modules (212, 214). The DC bus (210) is connected to receive a secondary (e.g. emergency) power supply (218, 224). The architecture may provide redundancy and on-the-fly reconfigurability to complement changes in the physical location of critical components in the destination, e.g. caused by virtualization, zoning or repair. The architecture is operable as a stand-alone uninterruptible power supply (UPS) or as an extended runtime generator for an existing UPS.

14 Claims, 11 Drawing Sheets

(56) References Cited

U.S. PATENT DOCUMENTS

| | | |
|---|---|---|
| 2006/0226706 A1 | 10/2006 | Edelen et al. |
| 2006/0290205 A1 | 12/2006 | Heber et al. |
| 2007/0183444 A1 | 8/2007 | Schoettle et al. |
| 2008/0067872 A1 | 3/2008 | Moth |

FOREIGN PATENT DOCUMENTS

| | | |
|---|---|---|
| EP | 1145494 B1 | 10/2006 |
| EP | 1890371 A1 | 2/2008 |
| WO | 00/41496 A2 | 7/2000 |
| WO | 03/023799 A2 | 3/2003 |

\* cited by examiner

EMERGENCY POWER SUPPLY APPARATUS

CROSS REFERENCE TO PRIOR APPLICATIONS

This application is a U.S. National Phase application under 35 U.S.C. §371 of International Application No. PCT/IB2009/007118, filed on Oct. 1, 2009 and claims benefit of priority to United Kingdom Patent Application No. 0818174.5, filed on Oct. 3, 2008. The International Application was published in English on Apr. 8, 2010 as WO 2010/038152 A1 under PCT Article 21(2). All of these applications are herein incorporated by reference.

FIELD OF THE INVENTION

This invention relates to emergency power supplies, e.g. uninterruptible power supplies (UPSs).

BACKGROUND TO THE INVENTION

Sensitive equipment such as that found in IT data centres (i.e. computer servers and the like) usually includes critical elements for which it is important that there is no break in power supply during operation. Some critical structures may even be sensitive to ordinarily acceptable variations in power supplied from a utility (e.g. mains power).

Conventionally, power is supplied to such sensitive equipment using an uninterruptible power supply (UPS), which can guarantee a unbroken energy supply even during an outage in mains power (described herein as a grid outage). Typically an UPS can only cover a grid outage for a limited period of time. The time limit may arise if the UPS emergency power is sourced from a limited energy storage like re-chargeable batteries. The period of time where the UPS can bridge a grid outage is denoted the UPS runtime.

As many business come to rely on the permanent availability of their IT systems, so the need to provide an emergency power capability that can address a greater fraction of possible grid outages at a given location increases. In other words, it is desirable to increase the length of UPS runtime so that even long grid outages (the occurrence probability of which may be very low) can be handled without system downtime.

In addition to critical elements, which require an unbroken power supply, IT systems may include other loads (e.g. cooling systems or other support apparatus) which need to operate to ensure safe running of the critical elements. These less critical but nonetheless urgent elements (referred to herein as "essential elements") may cope with a break in the power supply, but the duration of that break must be kept below a certain threshold. If the UPS runtime exceeds that threshold then it is necessary to include in the UPS functionality an ability to power the essential elements.

To address the demand for increased runtime, a typical UPS is fitted with either extended runtime battery storage or with a generator (often a diesel generator) that kicks in after a certain grid outage duration and thus limits the maximum grid outage duration that is seen by the UPS.

Increasing battery storage is simple but suffers from a number of drawbacks. Firstly, above a certain power level the physical amount of batteries required can grow beyond any practical level, whereby the solution becomes unpractical, unreliable and excessively expensive to maintain. Secondly, it can be difficult to power the essential elements because they are (by definition) not connected to the critical power line.

Providing a diesel generator is a more complex solution that suffers from other types of drawbacks. Firstly, diesel engines expose emission problems, noise and vibration. Secondly, the installation can be complex, which makes the cost per kW very high, especially for small systems/low power.

In practice the solution of increasing battery storage is often used for low power applications (typically below 10 kW) and a generator is used for important medium-high power applications (say 80 kW and up).

FIGS. 1 to 4 illustrate emergency power supply systems which embody the conventional principles discussed above. In FIG. 1, a UPS 100 is connected on a critical power line 102 between a data centre 106 and either mains power 108 or a diesel generator 110 depending on the status of an automatic transfer switch (ATS) 104. Essential loads are connected to the ATS 104 by a non-critical power line 112, which bypasses the UPS 100.

When a grid outage occurs, the UPS 100 is arranged to continue providing power to the critical loads using power from battery 114 as an input. The ATS 104 is arranged to switch from the mains power 108 to the generator 110 after a certain grid outage duration. When the supply from the generator 110 is online the essential loads will begin to receive power again and the UPS 100 can source power from the generator 110 from its inlet to power the critical loads and recharge the battery 114.

The essential loads suffer a downtime until the generator 110 kicks in. The size of the battery 114 is typically chosen to cope with most start-up obstacles of the generator 110 such that the power sources for the UPS 100 do not fail even if several start attempts or even minor repairs are needed to the generator.

The system shown in FIG. 2 is similar to that shown in FIG. 1, and where appropriate the same reference number is used for like components. In FIG. 2 the generator is implemented an AC fuel cell generator comprising a fuel cell 116 connected via a DC/AC converter 118 to the ATS 114. This arrangement may provide a faster and more reliable generator start-up, so the battery 114 may be smaller than the FIG. 1 system.

The system shown in FIG. 3 is similar to that shown in FIG. 2, and where appropriate the same reference number is used for like components. In this system the UPS 100 will never see a shortage of battery power (i.e. it is an "infinite battery" arrangement) because the fuel cell 116 is connected via a DC/DC converter 120 to the UPS battery input in parallel with the battery. However, in this system the essential loads are not supported.

The system of FIG. 4 is a special variant of the FIG. 3 arrangement which is disclosed fully in US 2008/0067872. In this arrangement the UPS 100 contains a bi-directional converter which allows the UPS 100 to supply the essential loads during a grid outage by the fuel cell generator.

FIG. 5 shows a typical implementation of double conversion UPS which is suitable for use in the systems shown in FIGS. 1 to 3. The UPS 100 consists of a rectifier 122 that converts power delivered from the ATS 104 (e.g. from the mains 108 or a generator during mains outage) into DC for supplying a DC bus 126. The DC bus 126 is connected to the critical load line 102 via an inverter 124 that converts power on the DC bus into AC power having the correct voltage and a frequency that is independent of what goes on in the grid supply.

The UPS may be distributed over a number of racks within the data centre. Each rack may have a UPS module 130 associated with it, each UPS module 130 containing a rectifier 122 and inverter 124. The mains power (power from ATS 114) is distributed to the inlets of the UPS modules via a grid AC rail 128 and outputs of the UPS modules are all fed into an outlet AC rail 132 that feeds the critical power line 102.

In a modular system like this one can individually dimension the system to match the demand for power capacity and add extra UPS modules beyond the needed net power consumption in order to offer redundancy and thus increase of power availability through fault tolerance.

For example, in a system where the net power demand is 30 kW, the net power may be covered by three 10 kW UPS modules, but an additional module may be added to provide N+1 redundancy (the modules share the load) thereby offering the ability to lose one module due to a fault without failing to deliver full power to the critical load.

SUMMARY OF THE INVENTION

At its most general, the invention proposes a modular emergency power system architecture with a plurality of output power supply lines for feeding power to a destination, in which the operational status of each output power supply line is configurable. The invention may be suitable for any critical infrastructure e.g. used by a professional knowledge-based enterprises, but may also be fit for residential applications or even vehicles for transportation. The destination may be a data centre, wherein the power is used for various IT applications.

In one aspect, the invention may provide emergency power supply apparatus comprising: a plurality of load bars for conveying power to a destination; a switch unit for selectively connecting each load bar to a primary power source; a DC bus arranged to receive DC power from a secondary power source; power conversion means connected between the DC bus and the plurality of load bars; and a controller in communication with the power conversion means to set a power transfer direction between each load bar and the DC bus thereby to control an operational state for each load bar.

Each load bar may represent a power rail from which one or more applications (i.e. loads) in the destination can draw power. Each load bar may be switchable by the controller between the following operational states:
  DC bus feed, in which when the primary power source is active its power is transferred to the DC bus via the power conversion means;
  AC export, in which when the primary power source is inactive power from the DC bus is transferred to the load bar for export from the apparatus;
  critical (no break) AC feed, in which unbroken power from the DC bus is fed to the destination at all times; and
  urgent (minimal break) AC feed, in which when the primary power source is active power is fed from it directly to the destination, but when the primary power source is inactive power is fed from the DC bus to the destination. The switch unit may be arranged to disconnect the primary power source from all of the load bar when the primary power source is inactive. If the inactivity is a "brown out", i.e. the primary power source is operating outside of its nominal voltage or frequency window, the switch unit may be arranged to connect to a load bar that occupies solely the DC bus feed state, since power conversion modules in the rectifier state may still operate for the primary power source even though it may not deliver power in the right form for powering applications in the destination. This arrangement may increase runtime.

The operational states described above are derived from a combination of the switch unit status and power conversion means status. For a first load bar in the urgent (minimal break) AC feed state, the switch unit connects the first load bar to the primary power source, so that the primary power source is available on that load bar when it is active. If the first load bar is connected to applications in the destination, those applications receive power from the primary power source directly. If there is a grid outage those applications may experience a break in power until the load bar can receive power from another source. Hence the first load bar is not connected to critical applications.

The primary power source may comprise a plurality of independent power sources, e.g. a plurality of different mains supplies. The switch unit may comprise a plurality of switching elements arranged to permit each independent power source to be connected to each load bar. With this arrangement, redundancy can be built into the switch unit.

The power conversion means may also be arranged to transfer power from the first load bar to the DC bus, i.e. a single load bar occupying the urgent (minimal break) AC feed state may also be arranged simultaneously to occupy the DC bus feed state when the primary power source is active. There may be one or more load bars dedicated to transferring power to the DC bus.

The power conversion means or controller may be arranged to detect a grid outage and in response arrange for the load bars occupying the urgent (minimal break) AC feed state to receive power from the DC bus. Power may be transferred from the DC bus to the load bars occupying the urgent (minimal break) AC feed state in a controlled manner such that power is transferred only when the power capacity deliverable by the secondary power source is above a threshold level. For example, the threshold level may be achieved when a long term power source, e.g. fuel cell generator or the like, is powered up and online.

In certain circumstances a load bar occupying the urgent (minimal break) AC feed state may be switched out of connection with the primary power source and fed from the DC bus even when there is no grid outage. For example, this may be done during periods where the cost of power from the primary power source is high.

In other circumstances the level of power fed from the DC bus may exceed the power requirement of the destination. This may be done intentionally. When this happens, the power conversion means may be arranged to export power from a load bar to the mains, e.g. by connecting a load bar that is sourcing power from the DC bus to the primary power source (when it is active or inactive). There may be one or more load bars dedicated to exporting power.

For a second load bar in the critical (no break) AC feed state, the switch unit is arranged to isolate the second load bar from the primary power source, so that the primary power source is not available on the second load bar even when it is active. The power conversion means is arranged to transfer power from the DC bus to the second load bar. The second load bar therefore only sees power from the DC bus and does not necessarily know where that power is ultimately sourced from.

When the primary power source is active, the DC bus may receive power therefrom via a load bar occupying the DC bus feed state. When the primary power source is inactive or there are no load bars occupying the DC bus feed state, the DC bus may receive power from the secondary power source. The secondary power source may include a renewable energy source, e.g. photovoltaic cell or the like, arranged to provide DC power to the DC bus under certain conditions. Power from the DC bus may be used to supplement power drawn from the primary power source on a load bar in the urgent (minimal break) AC feed state. The renewable energy sources may feed a dedicated DC bus connectable to the load bars for this purpose.

The destination may be partitioned into a plurality of zones. Each load bar may be connected to a respective zone. Each load bar may be connectable to a plurality of zones to provide additional flexibility. The invention can permit the operational status of a zone to be changed without physical rearrangement of hardware. Thus, in one embodiment a first load bar supplying a first zone may change from the urgent (minimal break) AC feed state to the critical (no break) AC feed without having to power down or break power to the applications in the first zone. This may be achieved by arranging the power conversion means to provide power capacity on the DC bus to support the first load bar, and then gradually to switch power provision to the first load bar from the primary power source to the DC bus.

This concept may have particular advantages when the destination comprises a plurality of physical servers where virtualisation is used. For example, virtualisation may permit all critical activities to be undertaken in a limited number of (e.g. one or two) zones. Only these zones need to be fed by load bars occupying the critical (no break) AC feed state. This can allow the secondary power source capacity to be optimised. Furthermore, the invention may permit different zones in the destination to be assigned critical status (and hence be of use for virtualisation) without rearrangement of physical hardware in the power supply. The power supply apparatus thus provides flexibility to facilitate virtualisation in the destination.

The power conversion means may comprise a plurality of power conversion modules, each power conversion module being connectable between the DC bus and each load bar and when active being arranged to occupy a single operating mode at any point in time. The power transfer function of the power conversion means may be implemented by assigning an operating mode to one or more of the power conversion modules. The controller may be arranged to determine which (e.g. how many) power conversion modules should be active, which load bar each active power conversion module should be connected to, and which operating mode each active power conversion module should occupy. Thus, the controller may control the operating state of each load bar by suitably configuring the power conversion modules and the switch unit.

Each active power conversion module may be arranged to occupy one of the following operating modes:
rectifier mode, in which the power conversion module is connected to one of the load bars to transfer power therefrom to the DC bus; and
inverter mode, in which the power conversion module is connected to one of the load bars to transfer power thereto from the DC bus.

A plurality of power conversion modules occupying the same operating mode may be connected to a common load bar. The controller may be arranged to determine how many power conversion modules make up the plurality. The determination may be based on a desirable or required power capacity for the common load bar. Moreover, the controller may be able to select a redundancy level for the common load bar through control of the number and operation modes of the plurality of power conversion modules.

Where the destination comprises a plurality of zones, each zone may be connectable to one or more of the load bars, which in turn may be supplied by a plurality of power conversion modules. The capacity and redundancy for each zone may be controllable, e.g. selectively adjustable. The controllability may be used to support individual zoning characteristics, such as reduced power capacity during grid outages (load shedding), reduced cooling during grid outages, or in response to a specific start up order (sequencing). The power consumption of a zone or a load bar may be detected e.g. by the controller. This may be advantageous when power saving schemes are implemented in the destination, e.g. to concentrate active applications in a few zones. Detection of reduced power in the destination may lead to deactivation of one or more power modules in the apparatus. This may save the quiescent losses of the power conversion modules which are shut down.

The plurality of power conversion modules connected to the common load bar may be connected in parallel in a load sharing manner, e.g. using droop control or the like. Each power conversion module may comprise a bi-directional converter or a rectifier element and an inverter element. When occupying the rectifier mode, each power conversion module may function as an output voltage controlled rectifier. When occupying the inverter mode, each power conversion module may function as either an output voltage controlled inverter or as an output current controlled inverter. If the power conversion module is connected in the inverter mode to a load bar occupying the AC export state, the power conversion module preferably functions as an output current controlled inverter.

The controller may be arranged to synchronise the AC signals from a plurality of the power conversion modules connected in inverter mode to a common load bar.

The load bar to which each power conversion module is connected and/or the operating mode of each power conversion module may selectively adjustable, e.g. via instructions from the controller. For example, the bi-directional converter may be changed from the rectifier mode to the inverter mode depending on the operating state of the load bar to which it is connected or to which it is to be connected. The bi-directional converter may be a current limiter arranged to run down its output before mode switching. Where a plurality of power conversion modules are attached to a common load bar in a load sharing manner, the loss of power cause by running down one of the power conversion modules can be compensated by the remaining modules.

The apparatus may be arranged to detect the status of the primary power source and to control the operational states of the load bars based on the detected status. In one embodiment, the switch unit may be arranged to detect the status of the primary power source and to communicate the detected status to the power conversion modules connected to a load bar that is connected by the switch unit to the primary power source, whereby the operating modes of the power conversion modules are selectable based on the communicated detected status. This arrangement may permit activation of power conversion modules occupying the inverter mode connected to a load bar occupying the urgent (minimal break) AC feed state if the primary power source becomes inactive, e.g. delivers no power or operating outside of its nominal window of voltage and frequency. In other words, the power conversion means is dynamically controlled to provide the necessary power transfer for the load bars based on their respective operational states.

In one embodiment, each power conversion module connected to a load bar occupying the urgent (minimal break) state may be arranged to determine whether or not power from the primary power source is present on the load bar, and if no power from the primary power source is detected, to operate in the inverter mode. Thus, the power conversion modules may select their operating mode autonomously. Alternatively, the power conversion module may be arranged to monitor its own power deliver (in rectifier mode) since this goes to zero if the primary power source becomes inactive.

The primary power source may be an AC source, e.g. mains power from a utility. In one embodiment, the switch unit may apply a detection signal to a power signal from the primary power source, and the power conversion modules may be arranged to recognize the detection signal to determine whether or not power from the primary power source is present on the load bar. In another embodiment, the power conversion modules connected to a load bar occupying the urgent (minimal break) state may be arranged to operate in the inverter mode to move the frequency of the load bar above the frequency of the power signal from the primary power source, and the power conversion modules may be arranged to detect the frequency on the load bar to determine whether or not power from the primary power source is present on the load bar. Alternatively, the primary power source may be a DC source. In this case the load bars may carry DC power and the power conversion means may be arranged to perform suitable DC/DC conversion between them and the DC bus.

The secondary power source may include a internal or external DC generator, such as a fuel cell generator or photovoltaic cell or microturbine. The secondary power source may include a bridge power module arranged to maintain the voltage of the DC bus in the event of a power outage at the primary power source. The bridge power module is preferably arranged to maintain the DC bus voltage at level to feed adequately the load bars operating in the critical (no break) AC feed state for the time it takes to activate other (e.g. more permanent) power sources, e.g. a DC generator. The bridge power module may include a supercapacitor or battery. The bridge power module may also serve as a limiter of the load step dynamics seen by other (slower) modules in the secondary power source e.g. a fuel cell, as the bridge power module may cover for rapid changes in power demand. The bridge module may be charged from the DC bus. The bridge module may be charged by other modules in the secondary power source, e.g. via the DC bus.

Power may be provided to the DC bus from a plurality of sources according to a priority protocol, e.g. under the control of the controller. The priority protocol may be arranged to ensure that only one of the sources providing substantially all of the power to the DC bus when the voltage of the DC bus lies in a predetermined (preferably user programmable) range. The priority protocol may be effected automatically. For example, one or more power control modules operating in the rectifier mode, the DC generator and the bridge power module may be arranged to provide power to the DC bus autonomously according to a three level priority protocol. Priority protocol of more than three levels may be implemented. In one embodiment, the delivery voltage of the power control modules is set to be greater than the delivery voltage of the DC generator, which in turn is set to be greater than the delivery voltage of the bridge power module, whereby the source of power transferred to the DC bus is automatically selected based on the voltage of the DC bus. An external DC source may be connected to the DC bus, e.g. from the DC bus of a parallel apparatus. If the voltage of the DC bus is higher than the preset output voltage of the power conversion modules set to fed it, those power conversion modules will stop producing current. The priority protocol may be adjustable on-the-fly. This may be advantageous if the secondary power source include renewable energy sources whose power output may be variable. When such energy source are active, it may be desirable for them to dominate the power supply, even taking priority over the primary power source. The control unit may cause the renewable energy source to deliver an output voltage greater than that derived from the primary power source, so that power on the DC bus is dominated by the renewable energy source.

The controller may be arranged to adjust the availability of power on a load bar that is fed from the DC bus. The controller may be arranged to measure the power drawn from each DC bus-fed load bar and determine based on the power drawn and a current maximum power availability for that load bar (i.e. the number and capacity of power conversion modules connected in an inverter mode between the DC bus and load bar) whether the current number of connected power conversion modules should be increased or decreased. In one embodiment, the controller is arranged to set an availability frame associated with a load bar. The availability frame may correspond to a drawn power level range. If the drawn power exceeds the range, the controller may increase capacity to maintain the availability. If the drawn power is less then the range, the controller may reduce capacity to still meet the required availability. The availability frame for a DC bus-fed load bar may be calculated by the controller based on the current number of power conversion modules supplying that load bar.

The switch unit may be arranged to detect the status of the primary power source and disconnect the load bars from the primary power source if the primary power source is inactive.

The configurability of the apparatus of the invention enables it to perform the functions of both an extended run generator (i.e. back up power source for a UPS) and as a UPS in its own right. Moreover, the apparatus may be switchable between the two states without loss of power at the destination. An advantage of this on-the-fly reconfiguration is that it facilitates repair or replacement of UPS components. It also allows post-installation testing of a power conversion module on an urgent load bar before engaging it onto a critical load bar.

Accordingly, in another aspect, the invention provides an extended run generator for providing back up power to a conventional uninterruptible power supply for critical loads in a destination in the event of a grid outage, the generator comprising apparatus as described above having a first load bar occupying the urgent (minimal break) AC feed state connected to the conventional uninterruptible power supply (conventional UPS). The conventional UPS thus receives the power on that power bar. In the event of a grid outage (i.e. loss of power from the primary power source), the controller may be arranged to activate the secondary power source in the generator and configure the power conversion means to transfer power from the DC bus to the first load bar. Meanwhile, the switch unit may disconnect the first load bar from the primary power source. When the secondary power source is online, the conventional UPS can source power from the first load bar once again. During the window between grid outage and bringing the secondary power source online, the conventional UPS may provide power to the destination from an inbuilt bridge power module. If the secondary power source of the extended run generator has a bridge power module, e.g. supercapacitor or the like, the window between grid outage and bringing the secondary power source online may be short, thereby saving the back up power capacity required in the conventional UPS.

The conventional UPS may be connected to critical applications in the destination. The generator incorporating the apparatus of the invention may has a second load bar occupying the urgent (minimal break) AC feed state which bypasses the uninterruptible power supply to connect directly to urgent (i.e. important, but non critical) loads in the destination. When there is a grid outage, the urgent loads in the destination see a break in power that is present on the second load bar. However, when the second power source is online, the controller may be arranged to configure the power conversion means to transfer power from the DC bus to the second load bar to provide power to the urgent loads. The controller may be arranged to delay switching power from the DC bus to the second load bar, e.g. until a DC generator in the secondary power source is online (i.e. fully operational).

If the conventional UPS needs repair, the extended run generator may be reconfigured on-the-fly as a UPS. Thus, the controller may be arranged to reconfigure the power conversion means to cause the second load bar additionally to occupy the DC bus feed state and then the first load bar to occupy the critical (no break) state, to permit removal or testing of the uninterruptible power supply. In other words, the second load bar is arranged to feed the DC bus from the primary power source and the power conversion means is configured to deliver power from the DC bus to the first load bar. When the power transferable from the DC bus exceeds a predetermined level (i.e. the power capacity and availability switched into the first load bar from the DC bus is above a set threshold) the switch unit may disconnect the first load bar from the primary power source so that it receives power only from the DC bus. If there is a grid outage, a power transfer failure from the second load bar to the DC bus may cause the secondary power source to be activated. This may occur using the priority protocol outlined above. The DC bus voltage may thus not suffer a break in power supply and hence the first load bar may continue to supply power without a break.

When there is a grid outage the parts of the power conversion means that were previously feeding the DC Bus while the grid was present may become available to work in an inverter mode to feed the second load bar (as soon as the secondary power source is ready to do so). The apparatus thus provides extended runtime power for the urgent (minimal break) AC feed load bar with no additional hardware.

The apparatus of the invention may thus be incorporated into an uninterruptible power supply (UPS) for providing unbroken power to critical loads in a destination in the event of a mains outage. The UPS may comprising apparatus as described above having a first load bar connected via the switch unit to the mains and occupying the DC bus feed state, and a second load bar occupying the critical (no break) AC feed state connected to the critical loads.

The first load bar or a third load bar may be connected to urgent loads in the destination and configured to occupy the urgent (minimal break) AC feed state.

Other aspects of the invention may include a method of reconfiguring the apparatus, a method of implementing the priority protocol and computer program products having executable instructions thereon which when executed by a computer perform those methods.

BRIEF DESCRIPTION OF THE DRAWINGS

Examples of the invention are discussed below with reference to the accompanying drawings, in which.

DETAILED DESCRIPTION; FURTHER OPTIONS AND PREFERENCES

Figure 6:
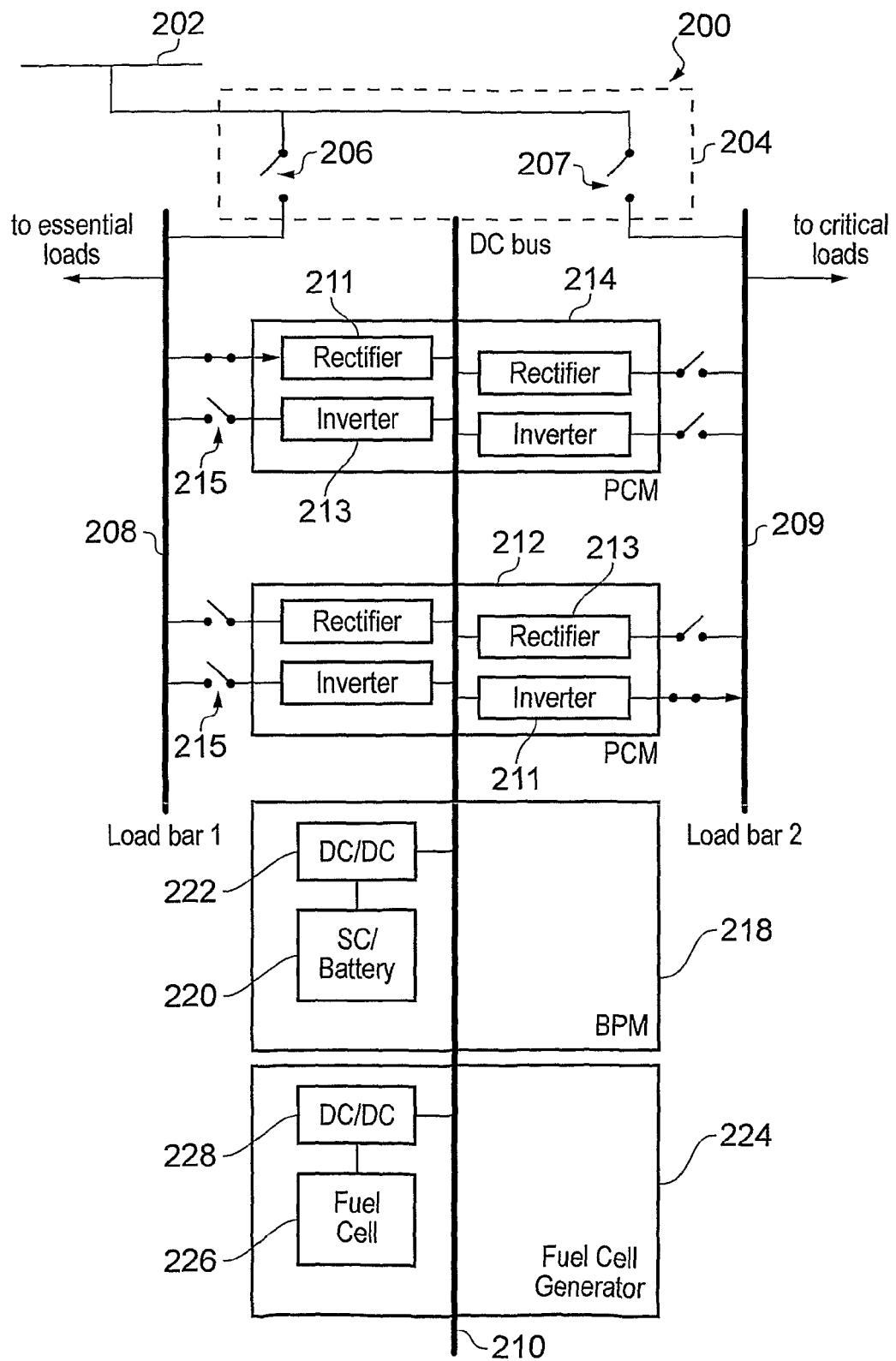
FIG. 6 is a schematic view of emergency power supply apparatus that is an embodiment of the invention.

FIG. 6 shows emergency power supply apparatus 200 that is a first embodiment of the invention. The apparatus comprises a master switch unit 204 connected to a primary power source 202, which may be mains power supply from a utility. The switch unit has a first switch 206 for selectively connecting the primary power source 202 to a first load bus 208 (load bar 1) and a second switch connected in parallel with the first switch 206 for selectively connecting the primary power source 202 to a second load bus 209 (load bar 2). The load buses 208, 209 (hereinafter load bars) may thus be individually connected to or disconnected from the primary power source by the switch unit 204. The master switch unit 204 may be a piece of dedicated apparatus (e.g. a plug-in module) as discussed in the embodiments below, or may be incorporated as part of a rack or backplane system in which the apparatus is installed.

The load bars 208, 209 may each be connected to one or more applications requiring power in a destination (not shown). For example, one of the load bar may be connected to supply power to "essential" loads, which are applications that need to operate in the destination for it to function properly but that can experience a break in power supply. Another of the load bars may be connected to supply power to "critical" loads, which are applications that need to operate in the destination for it to function properly but that are sensitive and cannot experience a break in power supply.

Load bars which supply power to essential loads may source their power directly from the primary power source, e.g. via the relevant switch in the switch unit. For example, if the first load bar 208 in FIG. 6 was to supply power to essential loads when the primary power source was active, first switch 206 would be closed. In contrast, load bars which supply power to critical loads do not source their power directly from the primary power source to ensure that any unexpected breaks e.g. due to a grid outage is not seen by the critical loads. Thus, if the second load bar 209 in FIG. 6 was to supply power to critical loads when the primary power source was active, first switch 207 would be open.

Instead of receiving power directly from the primary power source, a load bar which supplies power to one or more critical loads sources its power from a DC bus 210 having a voltage that is maintained above a threshold level by power from other sources (discussed below). The power is transferred from the DC bus 210 to the load bar by a power conversion means, which in this embodiment includes a power conversion module (PCM) 212 operating as an inverter (performing DC to AC conversion).

The power conversion means in FIG. 6 comprises a pair of PCMs 212, 214. Each PCM 212, 214 is connectable to each of the load bars 208, 209 as either a rectifier or a inverter. In this embodiment this functionality is provided by separate rectifier and inverter components 211, 213 in each PCM and a signal path with switching elements 215 for selectively connecting one of the rectifier or inverter components 211, 213 to one of the load bars 208, 209.

The DC bus 210 may receive power from a number of sources. For example, if the primary power source 202 is active, power may be transfer from a load bar that is sourcing from the primary power source 202 by the power conversion means, which in this example may include a PCM 214 operating as a rectifier (performed AC to DC conversion). The load bar feeding the DC bus may be dedicated to that purpose, i.e. it need not also feed loads in the destination. This may be useful, e.g. for charging components in the bridge power module (see below) or simply to maintain the DC bus 210 at a given voltage when the grid is active.

Referring to FIG. 6, if the primary power source 202 is active and switch 206 is closed, AC power from the primary power source is present on the first load bar 208. In this case, rectifier 216 in PCM 214 may source the first load bar 208 to provide DC power to the DC bus 210. If the primary power source 202 is not active, or the power conversion means is not arranged to transfer power from a load bar to the DC bus 210, the DC bus may receive power from a secondary power source connected directly to the DC bus. The secondary power source may comprise a plurality of elements. As shown in FIG. 6. it may include a bridge power module (BPM) 218. The BPM may be optional in arrangements which do not require a load bar occupying the critical (no break) AC feed state. For example, if the apparatus is arranged to operate as an extended run generator it may not need a BPM. However, a BPM may be useful in an extended run generator mode, e.g. to cover for rapid variations in the load demand on the DC load bus. The BPM 218 may be a short term power supply, e.g. arranged to maintain a voltage level for seconds or minutes. In this embodiment the BPM 218 comprises a supercapacitor or battery 220 for outputting DC power and a DC/DC converter 222 for converting the output DC power to a suitable level for the DC bus 210. The secondary power source may also include a fuel cell generator module 224. The fuel cell generator module 224 may be a longer term power supply, e.g. arranged to maintain a voltage level for minutes, hours or even days. In this embodiment the fuel cell generator module 224 comprises a fuel cell 226 for outputting DC power and a DC/DC converter 228 for converting the output DC power to a suitable level for the DC bus 210. An operating protocol for the different possible sources of power for the DC bus 210 is discussed below with reference to FIG. 13.

It can be seen in FIG. 6 that the operating states of the first and second load bars 208, 209 depend on the configuration of the switch unit 204 and the power conversion means (in this embodiment provided by the PCMs 212, 214). A controller (not shown) may be provided to configure the apparatus, e.g. by setting which load bar 208, 209 the PCMs 212, 214 connect to and in which direction they transfer power and by setting the switch state of the switch unit 204.

There are two PCMs in FIG. 6. Other embodiments may have more than two PCMs that are each connectable the load bars by means of a built-in switch mechanism. Each PCM may be connectable to any of the load bars. In practice each PCM is only connected to one load bar at any point in time. Each active PCM may be able to occupy one of two operating modes to convert power in one of two directions respectively. In an inverter mode the PCM may act as an inverter (DC/AC); in a rectifier more the PCM may act as a rectifier. The PCM comprises either a bi-directional converter which can switch between the modes or two individual modules that are each unidirectional, one being an inverter and the other a rectifier, in which only one of the individual modules is operational at any point whilst the PCM is active.

Where the PCM comprises a bi-directional converter, it also includes a switch mechanism operable to switch between the rectifier mode and inverter mode. The switch mechanism may only be operated when the converter is "in-active", i.e. normally not during operation.

Although only two load bars and two PCMs are illustrated in FIG. 6, it may be appreciated that the system is fully scalable, and any number of load bars may be used. For full functionality it is desirable to have at least the same number of PCMs as load bars. However, it may be preferable to have many more PCMs than load bars to permit flexibility in configuration and to provide redundancy where required. This may be achieved by furnishing a single system with many PCMs and/or setting several systems in parallel. In particular, the invention may permit a PCM to be installed and initialised by a test on one of the load bars that does not carry a critical load. Based on a successful test they may be re-allocated to a critical load bar. This procedure can be carried out whilst the system is operational and with only one installation operation, i.e. it is not necessary physically to reinstall the PCM when it is re-allocated to another load bar. Similarly, individual PCMs can be disengaged under full control and subsequently be replaced or repaired without any change to the nominal system. This substantially reduces the probability of faults and human errors.

The fuel cell generator module 224 that feeds the DC bus 210 could practically be any kind of known generator technology providing a DC output power.

The BPM 218 has a energy capacity that is capable of bridging the gap in between loss of the grid and the time where the fuel cell generator is ready to supply full power, e.g. after a start-up sequence. To meet the demand for power capacity and/or redundancy a plurality of BPMs may be applied similar to paralleling PCMs. The BPM may be based on re-chargeable batteries or more likely ultra capacitors (to offer a battery-free system) and may include a DC/DC converter to ensure that the output DC power meets the DC power protocol. The BPM may be charged with power from the primary power source 202 such that it is always ready to help maintain the DC bus voltage. For example, the BPM may be charged via a dedicated load bar from the switch unit 204 or via any active load bar.

The BPM 218 kicks in when the rectifier 216 fails to support the DC bus 210, but it is replaced by either the fuel cell generator 224 as soon as it is capable of producing sufficient power following the start-up procedure or the rectifier 216 if the primary power source 202 returns again before the DC bus 210 has received power from the fuel cell generator 224.

All of the modules discussed above (connected in parallel at DC or AC outlets) are stackable by means of known Droop control or P-control (a "soft" I-V-characteristic) principles. This permits the modules to share the load on the bus.

The apparatus may include a control unit (not shown in FIG. 6) arranged to configure the apparatus, e.g. to control settings of the switch unit 204 and the active PCMs. The control unit may set an operational state for each of the load bars through its control of the switch unit 204 and by setting operating modes of the PCMs. An example in which the control unit changes the system function from an extended run generator into a combined UPS and extended run generator by controlling only the switch unit and PCMs is described below with reference to FIG. 11. No physical alteration of hardware is required to achieve that change in function.

The control unit's main function is to set the configuration of the system. Broadly speaking this is achieved by disengaging PCMs from their current load bar and connecting them to another destination. In this way, it is possible to:
- change the operational state of one or more load bars, e.g. to change the overall function or setup of the apparatus, e.g. in the event of a grid outage;
- move power capacity from one load bar to another line (e.g. to increase or decrease the number of PCMs feeding a critical load bar or sourcing from an essential load bar), e.g. to cover a PCM failure or to permit power down and removal of PCM e.g. for testing or repair;
- change the redundancy protection for each load bar, e.g. to re-establish a redundancy on an critical load bus in the event of a PCM failure;
- regain system availability for the critical line in case of faults in one or more of the modules at that power line (in one example this may be achieved by sacrificing redundancy on a less important load bar).

The control unit may include a user interface arranged to permit a user to input instructions for reconfiguration. For safety, if the control unit receives a request for system reconfiguration e.g. from the user interface, it may be arranged to calculate the present availability of the system and evaluate the consequential availability after reconfiguration before allowing the system configuration to change. The control unit may check the consequential availability against a set of rules for redundancy set for the system by the user to check that the reconfiguration is permissible.

One important benefit of the flexible configurability of the apparatus of the invention is the ability to test a PCM on a load bar for "essential" loads before switching into a load bar for "critical" loads. Such testing may be under the control of the control unit.

The control unit may reconfigure the apparatus for further reasons, including any one or more of:
- load shedding, i.e. diverting power away from "essential" load bars during a grid outage to save energy and hence obtain an even longer runtime;
- peak shaving, i.e. initiating the secondary power source to effect on-site power generation whenever the electricity price is high;
- power saving, i.e. reducing power consumption at traditionally low-traffic hours;
- power regulation, i.e. transferring automatically to islanding (isolation from primary power source) or initiating the secondary power source to effect on-site power generation in response to a transmission system operator (TSO) request (e.g. to achieve a grid-balancing effect).

In configurations where on-site power generation occurs, e.g. during a grid outage or during peak shaving or power regulation, if excess power is generating a load bar may be connected to export power from the apparatus.

The apparatus shown in FIG. 6 may function as an extended run generator or as an uninterruptible power supply with built-in extended run generator. The configurations of the apparatus when performing these functions is described below with reference to FIGS. 7 to 10.

Figure 7:
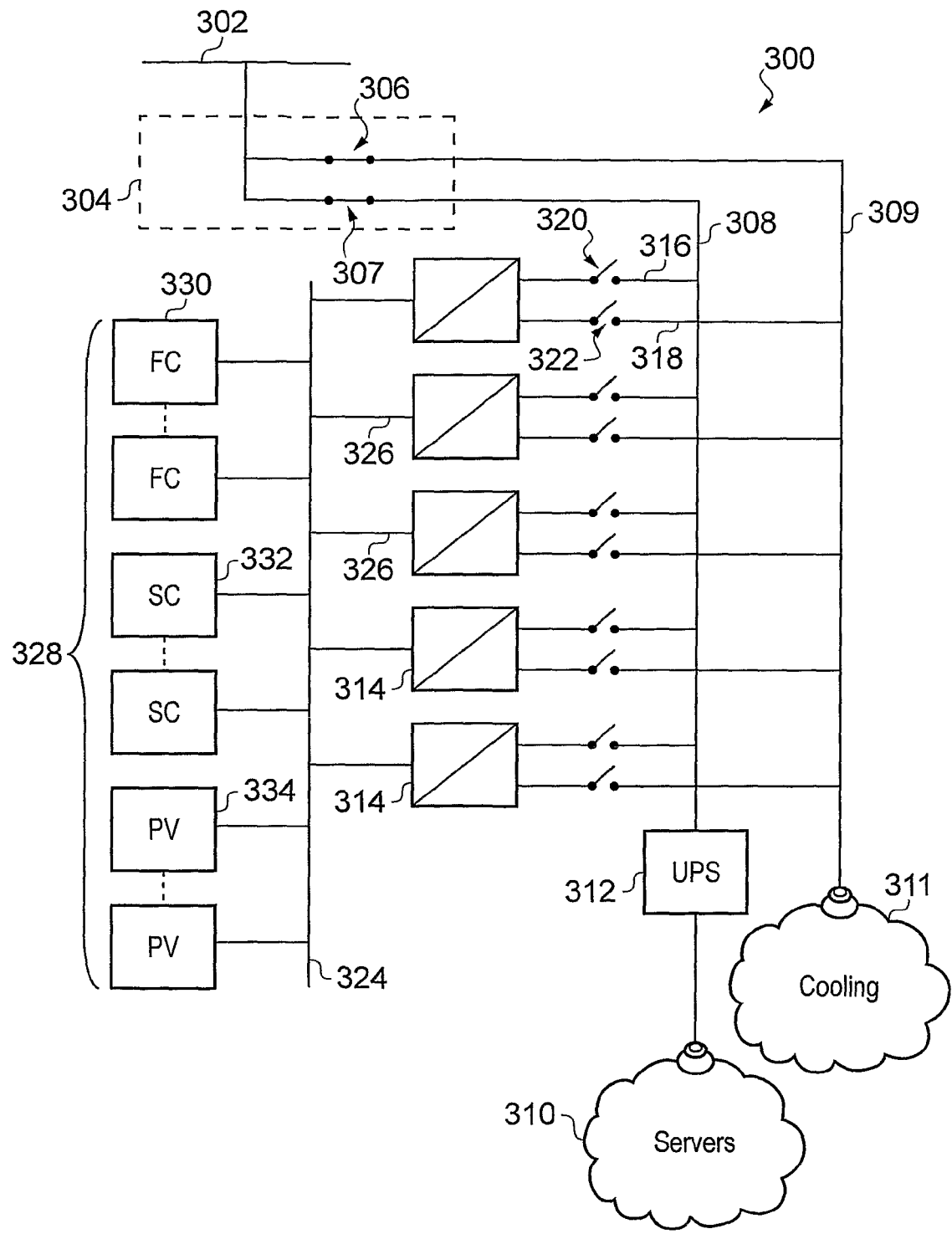
FIG. 7 is a schematic view of an emergency power supply system having an extended run generator that is an embodiment of the invention in a normal configuration.
Figure 8:
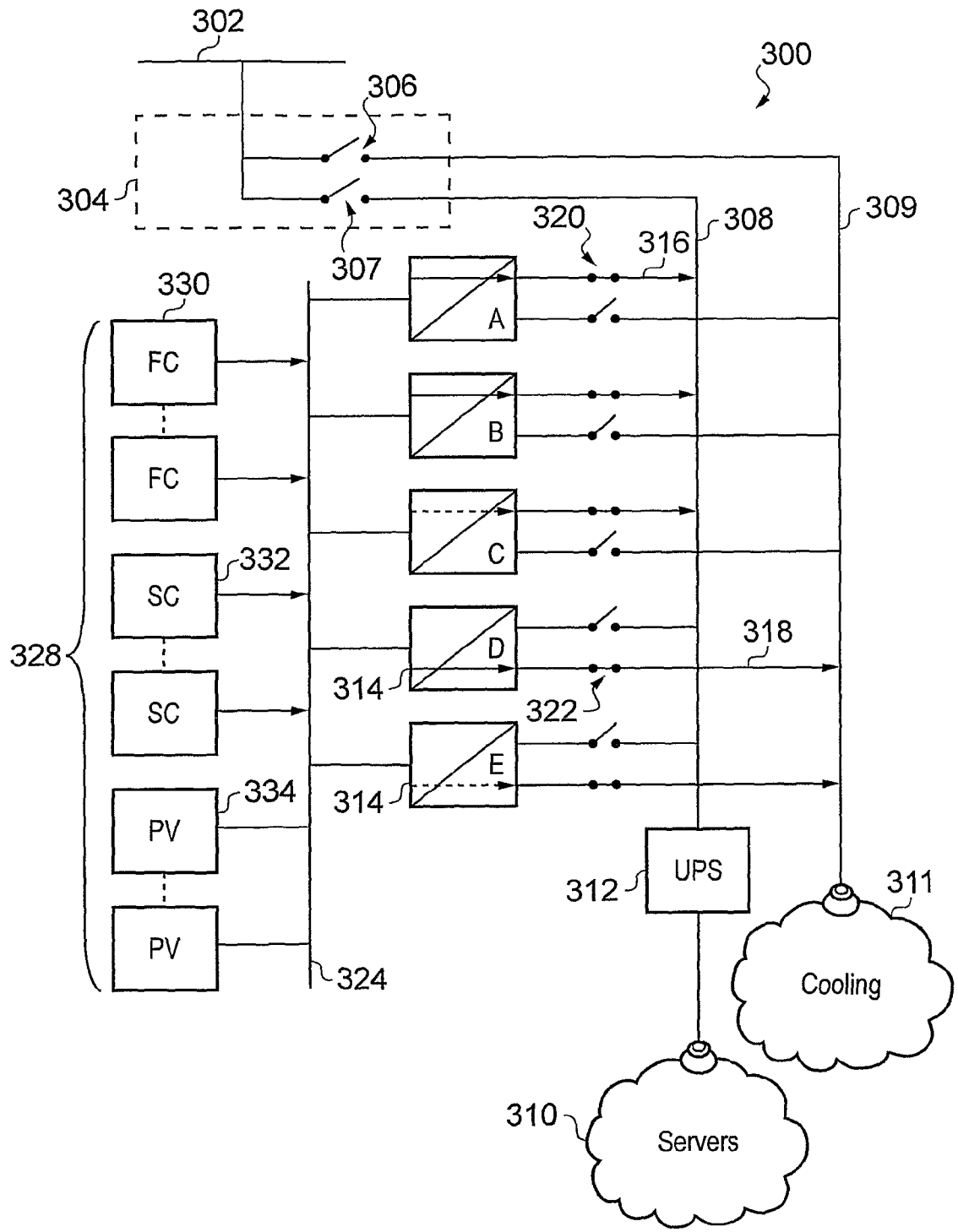
FIG. 8 is a schematic view of the emergency power supply system shown in FIG. 7 in a grid outage configuration.

FIGS. 7 and 8 shows a schematic view of an emergency power supply system 300 having an extended run generator provided by apparatus similar to that shown in FIG. 6. In FIG. 7 the system is in a first configuration corresponding to the grid being up (i.e. the primary power source being active). In FIG. 8 the system is in a second configuration corresponding to a grid outage (no power from the primary power source). In this system, the apparatus of the invention may act as a replacement of a traditional diesel backup generator, i.e. to supply a data centre with electrical power through an uninterruptible power supply system.

The system 300 comprises a switch unit 304 attached to the primary power source 302 (e.g. mains AC power from a utility). The switch unit 304 splits the mains power into two parallel load bars 308, 309, each having a corresponding switch 306, 307 to selectively connect it to the mains. In the extended run generator configuration with the mains active, both load bars 308, 309 are connected to the primary power source 302.

A first load bar 308 is connected to deliver power to a conventional UPS 312, which in turn feeds critical applications e.g. computer servers 310 at the destination. A second load bar 309 is connected directly to essential (but non-critical) applications e.g. cooling systems 311 at the destination.

In this embodiment five power conversion modules (PCMs) 314, each of which comprises a bi-directional converter, provide the power conversion means function. Each PCM 314 has a first signal line 316 that is connectable via switch 320 to the first load bar 308 and a second signal line 318 that is connectable via a switch 322 to the second load bar 309. If further load bars are present, the PCMs 314 may be provided with additional signal lines and switches accordingly. The switches are arranged so that at most one switch is closed at any time, i.e. so that each PCM is never connected to more than one load bar.

In FIG. 7 the PCMs 314 are all inactive, i.e. in standby mode.

Each PCM 314 is also connected to a DC bus 324 by a DC signal line 326. The DC bus 324 is connected to a secondary power source 328, which in this embodiment comprises a combination of three elements connected in parallel: (i) a plurality of supercapacitors 332, (ii) a plurality of fuel cells 330 and (iii) a plurality of photo-voltaic cells 334. The fuel cells 330 may be implemented as a traditional diesel generator adapted to output DC power. The supercapacitors 332 are an example of a bridge power module (BPM) and they may be optional, depending on how quickly the secondary power source needs to come online. The supercapacitors can also serve to filter any fast load steps (i.e. rapid rise in power demand on the DC bus), which may protect the fuel cells against high slope variations. The basic function of a BPM is to reduce the outage duration to maintain power while starting the fuel cells. This will reduce the outage duration and thus limit the outage consequences at the second load bar and reduce the amount of energy storage (typically batteries) that is needed for the external UPS.

The reduction of UPS runtime may allow the UPS to completely eliminate lead acid batteries by replacing them with better battery technology or even a super capacitor storage.

If the grid is active (as it is in FIG. 7), no power transfer is required to or from the DC bus, hence the switches 320, 322 are all open. The secondary power source may be inactive in this arrangement.

Figure 1:
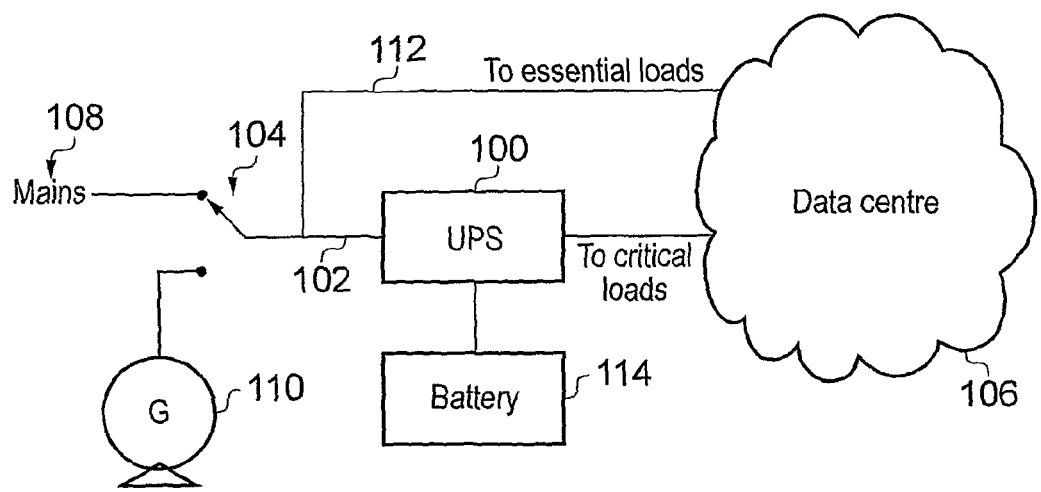
FIG. 1 is a schematic view of a conventional emergency power supply system, and is discussed above.
Figure 2:
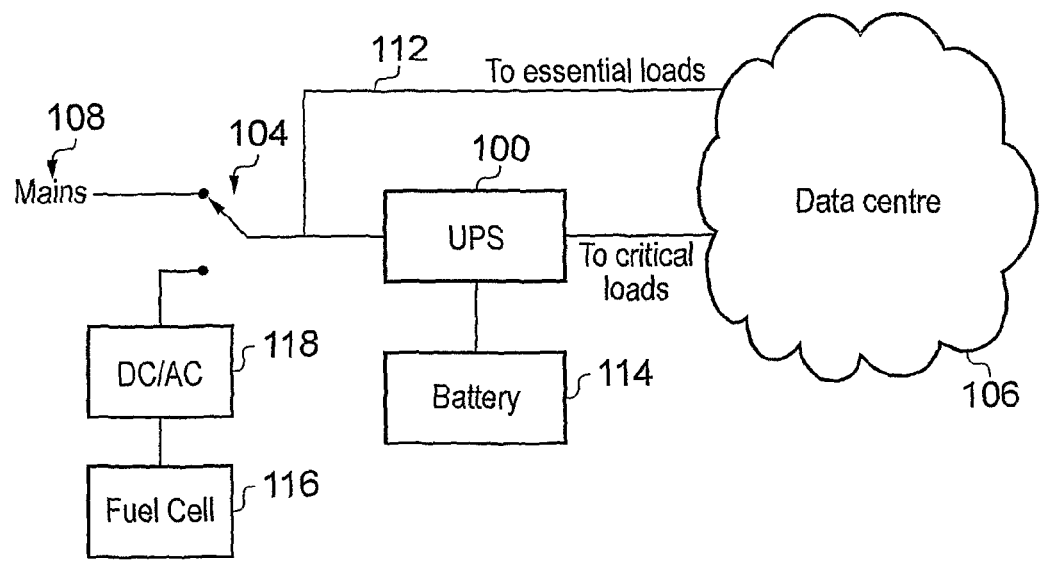
FIG. 2 is a schematic view of another conventional emergency power supply system, and is discussed above.
Figure 3:
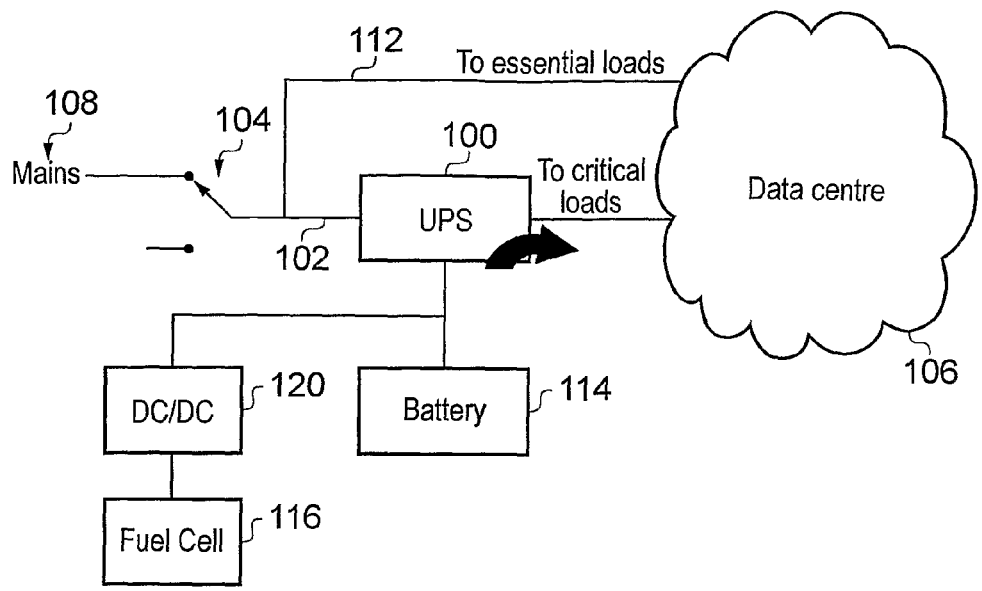
FIG. 3 is a schematic view of yet another conventional emergency power supply system, and is discussed above.
Figure 4:
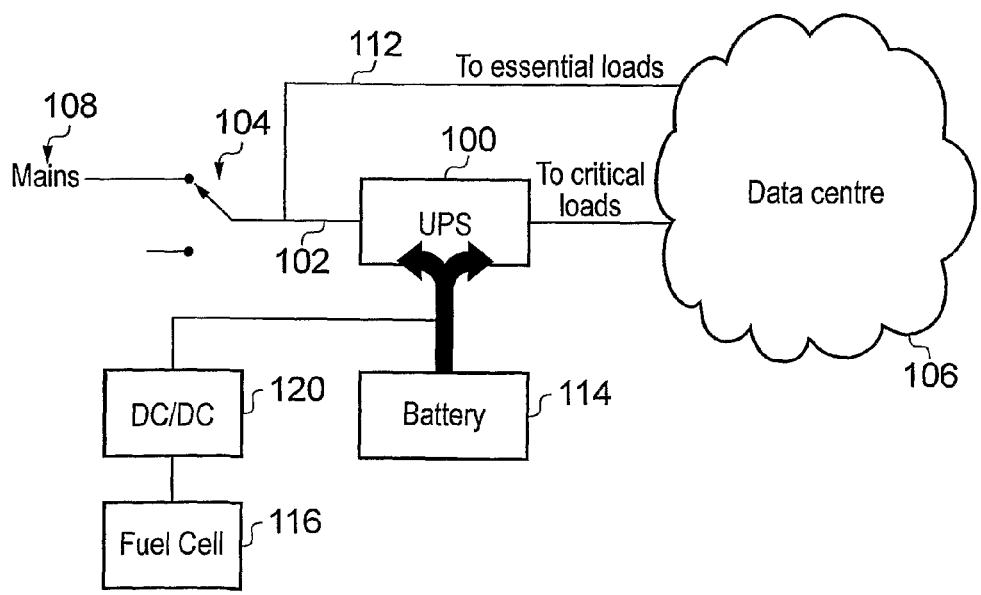
FIG. 4 is a schematic view of yet another conventional emergency power supply system, and is discussed above.
Figure 5:
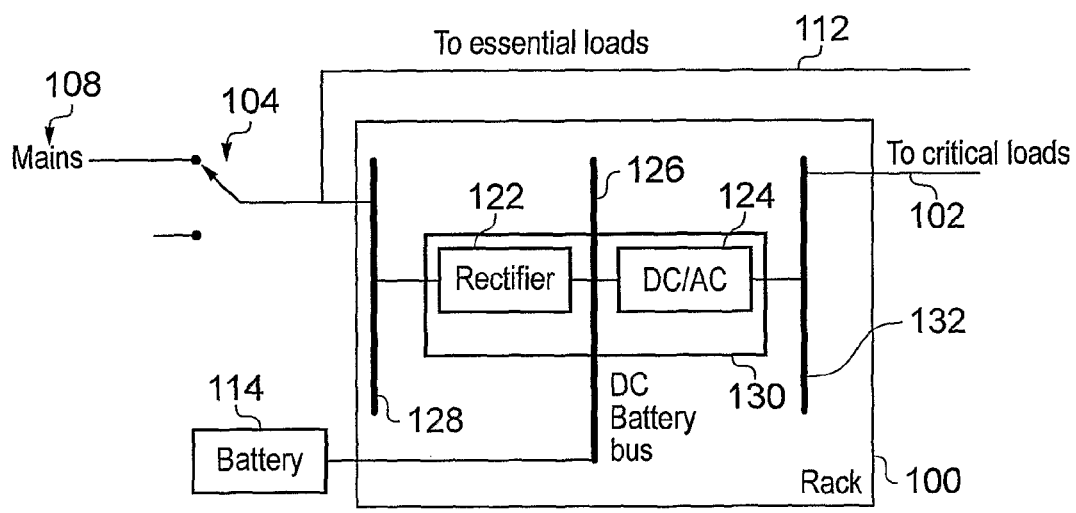
FIG. 5 is a schematic view of a conventional double conversion UPS.

The key function of the system shown in FIGS. 7 and 8 is to limit the grid outage duration seen by the UPS so that the UPS can handle any outage duration despite its limited battery storage capacity. This is similar to the arrangement discussed with reference to FIG. 2 above.

If there is a grid outage, a control unit (not shown) instructs the system to adopt the configuration shown in FIG. 8. The difference between FIGS. 7 and 8 is that the switches 306, 307 in the switch unit 304 are open to isolate the load bars 308, 309 from the primary power source. In other words the system is operating in an islanding state. In addition the secondary power source 328 is activated, so that DC power (in this example from the supercapacitors 332 and the fuel cells 330) is provided to the DC bus 324. In practice the supercapacitors 332 are arranged to deliver DC power in the immediate aftermath of the grid outage for a period during which the fuel cells 330 are initialised and brought online. The fuel cells 330 may be arranged to offer DC power delivery over a much longer time scale than the supercapacitors 332. The photo-voltaic cells 334 may act as a supplement to either or both of the fuel cells 330 and the supercapacitors 332. In some embodiments the priority of the photovoltaic cells may be adjustable, so that in certain circumstances they dominate power to the DC bus. In such cases, power from the DC bus may be used to supplement power from the primary power source, e.g. by load sharing among PCMs delivering power to the DC bus.

In the embodiment shown, all of the PCMs 314 are activated in the inverter mode to convert and deliver power from the DC bus 324 to either the first load bar 308 or the second load bar 309. Switch 320 is closed in PCMs A, B and C to enable them to provide AC power through signal line 316 to the first load bar 308. This power is seen by the UPS 312. Switch 322 is closed in PCMs D and E to enable them to provide AC power through signal line 318 to the second load bar 309. This power is seen by the cooling applications 311. The control unit may be arranged to delay closing switches 322 on PCMs 322 to focus the initial power deliver to the first load bar, thereby minimising (and perhaps even reducing to zero) the break in power seen by the UPS 312 and hence enabling its internal battery capacity to be reduced.

Although all five PCMs are active in FIG. 8, in fact PCMs C and E operate as redundant PCMs on the first and second load bars respectively (indicated by the dotted arrows).

When the grid (primary power source 302) becomes active again, the system may be arranged to switch back to the configuration shown in FIG. 7, e.g. by closing the switches 306, 307 in the switch unit 304. and opening the switches 320, 322 as appropriate. Before reconnection the PCMs may be synchronised with the primary power source (see below).

Figure 9:
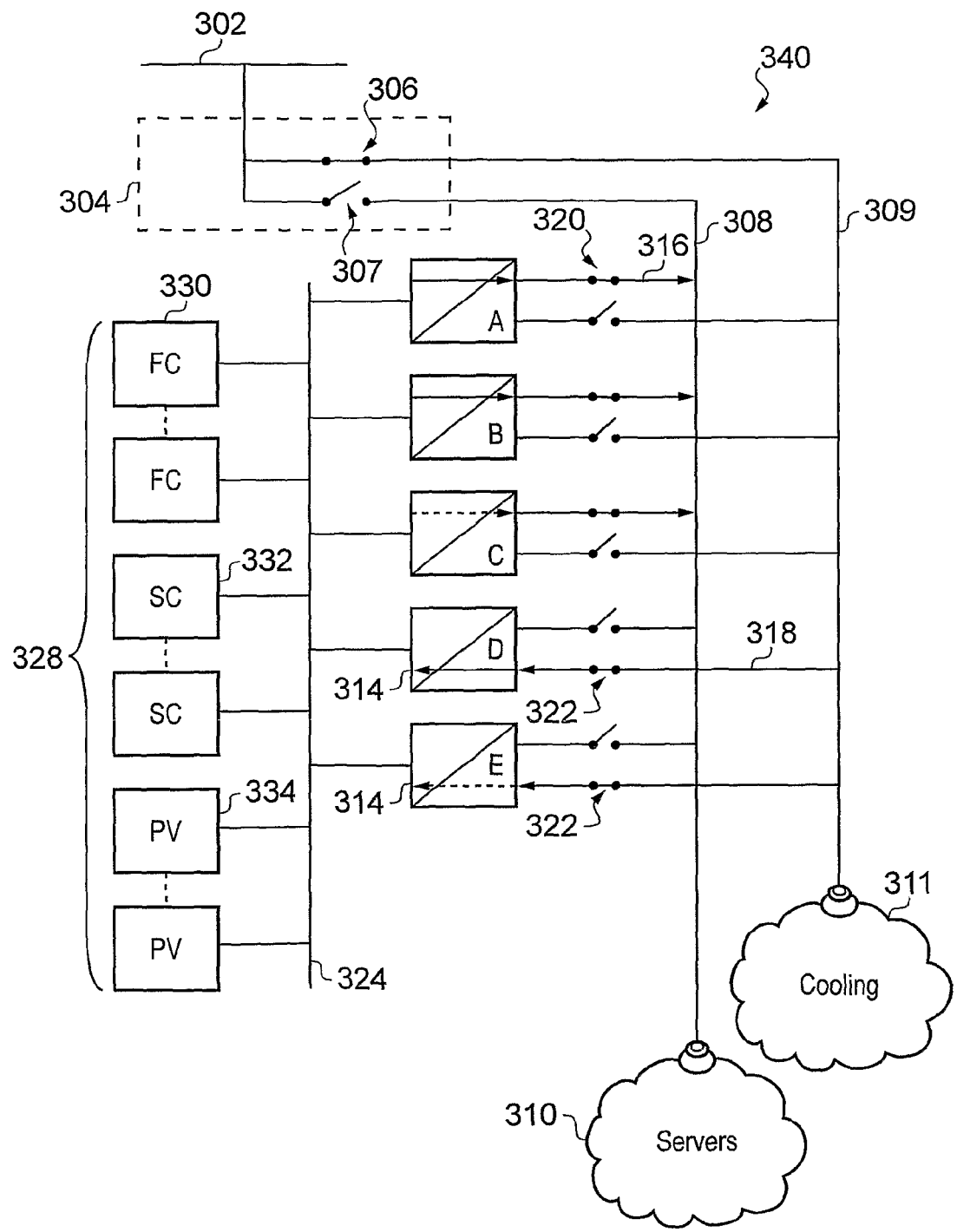
FIG. 9 is a schematic view of an emergency power supply system having an uninterruptible power supply that is an embodiment of the invention in a normal configuration.
Figure 10:
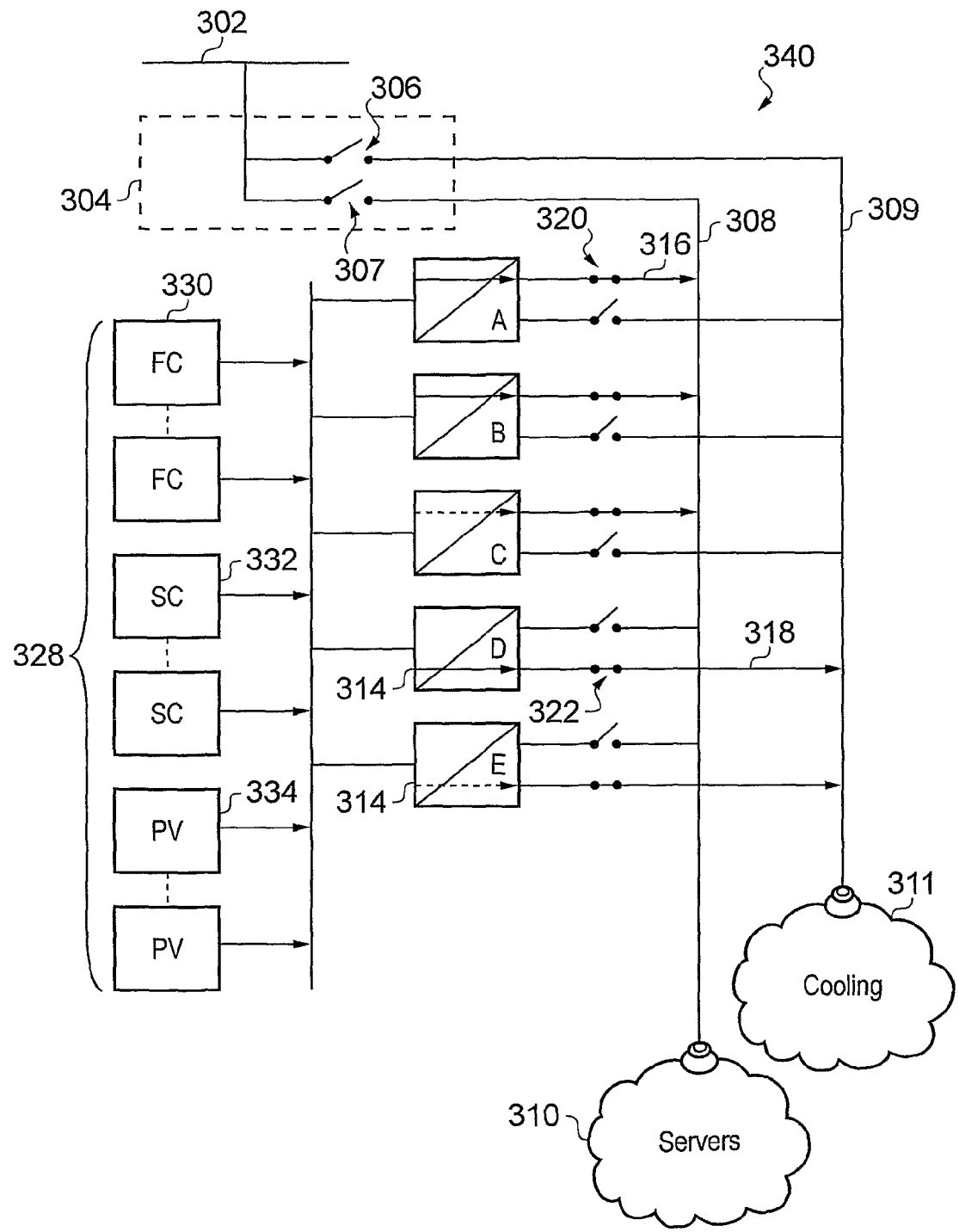
FIG. 10 is a schematic view of the emergency power supply system shown in FIG. 9 in a grid outage configuration.

FIGS. 9 and 10 shows a schematic view of an emergency power supply system 340 having a UPS provided by apparatus similar to that shown in FIG. 6. In FIG. 9 the system is in a first configuration corresponding to the grid being up (i.e. the primary power source being active). In FIG. 10 the system is in a second configuration corresponding to a grid outage (no power from the primary power source). In this system, the apparatus of the invention may act as a replacement of a traditional uninterruptible power supply system with built-in extended run generator. Even during a grid outage, the system offers a full no-break supply for some load bars (occupying a critical (no break) feed state and supplying critical applications) and a short break for other load lines (occupying an urgent (minimal break) feed state and supplying essential applications).

Components illustrated in FIGS. 9 and 10 having the same function as in FIGS. 7 and 8 are given the same reference numbers.

FIG. 9 shows the system configuration when the grid (primary power source 302) is active. The switch unit 304 is configured so that switch 307 is open to isolate the first load bar 308 from the primary power source 302 but switch 306 is closed such that power from the primary power source 302 is present on the second load bar 309.

The first load bar 308 is connected directly to the servers 310, which are critical applications in the destination. Accordingly it the first load bar 308 must occupy the critical (no break) AC feed state. This is achieved by configuring the power conversion means so that the first load bar 308 always sources power from the DC bus 324. The system is configured to guarantee power provision to the DC bus 324 irrespective of whether the grid is up or out, as described below.

In this embodiment, the second load bar 309 performed two functions when the grid is up (i.e. when the primary power source 302 is active). In other embodiments these two functions may be performed independently by separate load bars. The first function is to transfer power to the DC bus 324 from the grid. This is achieved by suitably configuring the power conversion means. In this embodiment, two PCMs 314 (PCMs D and E in FIG. 9) are activated in their rectifier mode and are connected to the second load bar 309 via signal line 318 by closing switch 322. The second function is to supply power directly to cooling applications 311 in the destination. These applications are important for correct operation of the destination, but can cope with a small break in power: they are thus "essential" applications. Thus, in this embodiment the second load bat 309 occupies both a DC bus feed state and an urgent (minimal break) AC feed state.

The first load bar 308 receives power from three PCMs 314 (PCMs A, B and C in FIG. 9) that are activated in the inverter mode to convert and deliver power from the DC bus 324. Switch 320 is closed in PCMs A, B and C to enable them to provide AC power through signal line 316 to the first load bar 308. This is the power that is seen by the server applications 310.

Similarly to FIG. 8, although all five PCMs are active in FIG. 9, in fact PCMs C and E operate as redundant PCMs on the first and second load bars respectively (indicated by the dotted arrows).

As shown in FIG. 9, power is provided to the DC bus 324 solely from the second load bar 309 when the primary power source 302 is active. The secondary power source is inactive. However, in certain circumstances, e.g. to perform peak shaving, the secondary power source 328 may be activated whilst the primary power source is still active. When the secondary power source 328 is on line, power provision to the DC bus 324 may be transferred to it by powering down the PCMs 314 operating in the rectifier mode, e.g. by reducing their output voltage so that the output voltage of the secondary power source 328 dominates. In this way the second load bar may stop operating in the DC bus feed state. However, it continues to operate in the urgent (minimal break) AC feed state.

If there is a grid outage, a control unit (not shown) instructs the system to adopt the configuration shown in FIG. 10. The key difference between FIGS. 9 and 10 is that the DC bus 324 is now fed by the secondary power source 328. In practice, a drop in voltage provided from the second load bar 309 to the DC bus 324 via the PCMs 314 in the rectifier mode will be detected, which will cause activation of the secondary power source 328. The PCMs 314 may detect the drop in voltage and send instruction e.g. via a control unit to the secondary power source 328, or the control unit may perform both detection and activation steps. As mentioned above, the supercapacitors 332 are arranged to deliver DC power in the immediate aftermath of the grid outage for a period during which the fuel cells 330 are initialised and brought online. The fuel cells 330 may be arranged to offer DC power delivery over a much longer time scale than the supercapacitors 332. The photo-voltaic cells 334 may act as a supplement to either or both of the fuel cells 330 and the supercapacitors 332. As above, the photo-voltaic cells may be arranged to dominate power delivery to the DC bus, e.g. to supplement power from the primary power source.

The configuration of the PCMs 314 (A, B and C) feeding the first load bar 308 does not change between FIGS. 9 and 10. In fact the first load bar 308 does not experience any substantial loss in power because it is sourced from the DC bus 324, whose voltage is maintained through activation of the secondary power source 328 as described above.

Meanwhile, the grid outage causes a loss of power on the second load bar 309. This loss of power will be experienced by the cooling applications 311. However, once the secondary power source 328 is fully online (e.g. after the fuel cells 330 become operational) the PCMs 314 (D and E) that were operating in the rectifier mode are switched to operate in the inverter mode whereby they transfer power from the DC bus 324 to the second load bar 309, which is then used to power the cooling applications 311. The break in power experienced by the cooling applications 311 is therefore short, e.g. the length of time from grid outage until the fuel cells 330 become operational. This is typically a few seconds.

An advantage of the invention is the ability of the system shown in FIG. 7 to change into the system shown in FIG. 9 or vice versa without requiring substantial physical adjustment or reconnection of hardware or power down of the destination.

Figure 11:
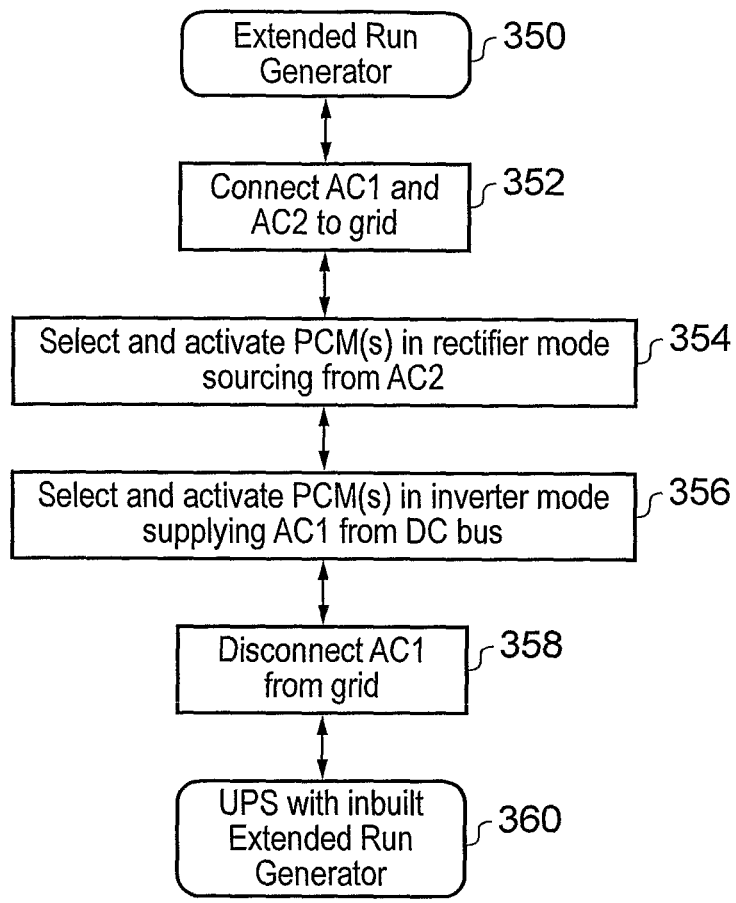
FIG. 11 is a flow chart showing steps for reconfiguring an extended run generator as an uninterruptible power supply.

The steps involved in changing between the systems are shown in FIG. 11. Thus, for the extended run generator mode 350 shown in FIG. 7, the load bars 308, 309 (referred to as AC1 and AC2 respectively in FIG. 11) are both connected to the primary power source 302 (grid) 352. To begin the change to UPS mode, the control unit selects and activates one or more PCMs 314 in the rectifier mode and closes switch 322 for those PCMs so that they source the second load bar 309 via signal line 318. This causes the second load bar 309 to occupy the DC feed state in addition to its existing function of feeding the essential loads. After this step is complete, the DC bus 324 is provided with an operational voltage from the second load bar 309. The next step in the change to UPS mode is the control unit selecting and activating one or more PCMs 314 in the inverter mode and closing switch 320 for those PCMs so that they supply the first load bar 308 with power from the DC bus 324 via signal line 316. Finally, the first load bar 308 is disconnected from the primary power source by opening switch 307 in the switch unit 304. The first load bar 308 then sources its power solely from the DC bus and hence occupies the critical (no break) AC feed state. The system is then in the UPS mode 360.

The PCMs 314 described above comprise bi-directional converters. In other embodiments they may comprises a rectifier-inverter pair. Alternatively, each PCM may be uni-directional. However, as long as enough PCMs are provided to permit configurable power transfer in both directions to or from each load bar and the DC bus, the system may confer the benefits of the invention.

The operational states of the load bars 308, 309 in the two modes discussed above are summarised in the following table:

| | Extended Run Generator mode (FIGS. 7 and 8) | UPS mode (FIGS. 9 and 10) |
|---|---|---|
| First load bar (308) | Urgent (minimal break) AC feed | Critical (no break) AC feed |
| Second load bar (309) | Urgent (minimal break) AC feed | Urgent (minimal break) AC feed DC bus feed (when grid active) |

A load bar occupying the urgent (minimal break) AC feed state is powered both under normal grid conditions and under islanding, but there may be short interrupts when re-configuring the system after a grid outage. In the extended run generator mode, the critical applications in the destination are protected by an external UPS. For essential applications these short interrupts may be acceptable. The interrupt duration depends on the time to replace the grid (either using a bridge power module (which takes less than a second, e.g. a few milliseconds, to become operational) or a fuel cell generator (which can take seconds to minutes to come online).

The systems described above are symmetrical, i.e. the roles of the first load bar and second load bar may be switched. Furthermore, the systems described above demonstrate the principles using one critical load and one essential load line. In fact the invention can support multiple critical load lines and multiple essential load lines.

The load bars 308, 309 may be 1-phase AC or 3-phase AC. In another embodiment, the primary power source may be DC and the load bar may carry DC. In this embodiment, each power conversion module may be a bi-directional DC/DC converter.

The plurality of the systems discussed above may be used in a modular architecture, wherein the system modules are connected to each other either in parallel or in series or in a combination of parallel and series coupling. This may be particularly useful if the data centre is segregated into a number of zones. Each zone may have individual requirements for e.g. availability target and energy cost optimisation.

The modular architecture may permit control over how the resources of the system can be allocated between zones, e.g. to enable redundancy to be transferred from one zone to another, or to enable power capacity to be transferred from one zone to another. A further advantage of the module architecture is the system's ability to reconfigure itself on-the-fly in case of e.g. a faulty module. For example, the reconfiguration may be to re-establish redundancy or power capacity. In another example the reconfiguration may be to respond to dynamically changing loads.

Figure 12:
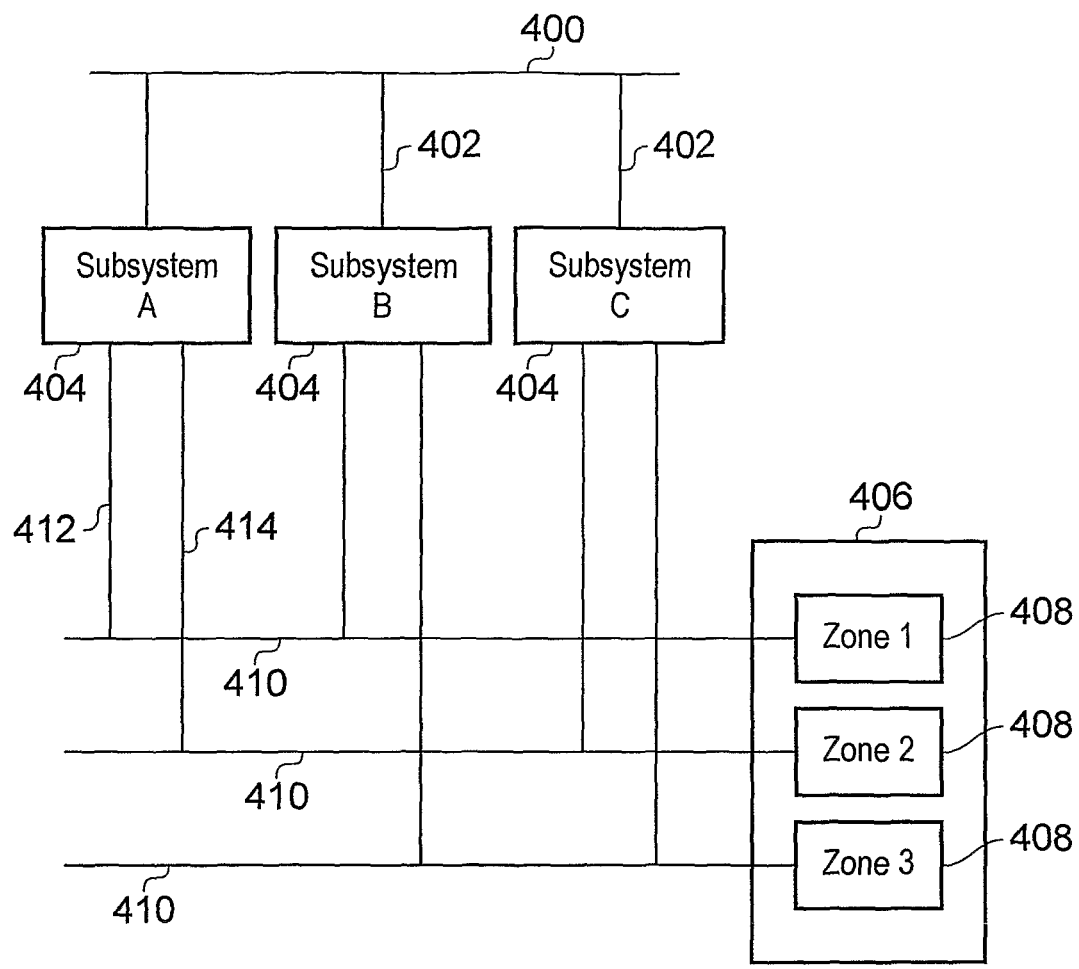
FIG. 12 is a schematic view of a modular emergency power supply system that is an embodiment of the invention arranged to supply a destination partitioned into zones.

FIG. 12 illustrates an example of the principles of zoning. In FIG. 12 three subsystems 404 similar to the systems discussed above are connected to the mains power 400 via feed lines 402. Each of the subsystems is arranged to provide power on two configurable load bars 412, 414. A destination 406 is partitioned into three zones 408, each zone having an input feed line 410 associated with it. Each of the input feed lines 410 is connected to two load bars from different subsystems.

Zoning becomes especially advantageous in cases where the servers are operated by a virtual server operating system that allows prioritizing the services/applications and placing them in different zones (i.e. on specific server hardware locations). This makes it possible to group applications according to priority and to place them in zones, where energy optimisation and availability can be individually set. This feature strongly supports virtualisation of servers, including the use of virtualisation to optimise energy cost according to data centre service/traffic load. It also allows to preset different schemes and priorities for operation during grid outages (like load shedding).

As mentioned above, the systems of the invention may offer secondary function that can either reduce the energy cost or to obtain revenue from making the secondary power source capacity available to the grid. For example, during periods of time where electricity price is high the system may be forced into the islanding state. Alternatively, the secondary power source may be activated even if the grid is also active, e.g. by having the generator modules take over the power supply from the rectifiers. This may be done by setting the generator output voltages at a higher voltage than the nominal DC bus voltage set for the rectifiers such that the rectifiers stop sourcing, or simply by disengaging a part of the rectifiers such that the bus voltage drops as soon as the rectifiers cannot sustain the load on the DC bus.

If the secondary power source generates more power that the loads consume the direction of some of the rectifiers may be changed so that they can export power into the grid.

The power conversion modules discussed above may each be provided as a physically separate component engagable with the apparatus. Each module may be provided with one or more connector plugs arranged to mate with corresponding features on the DC bus and/or each load bar. The modular architecture may fully support the PlugAndPlay principle.

Another advantage of the apparatus is that the switches need only be dimensioned for the local power level, i.e. the switch unit carries only the power of one rack, a PCM only carries the power of one module.

Figure 13:
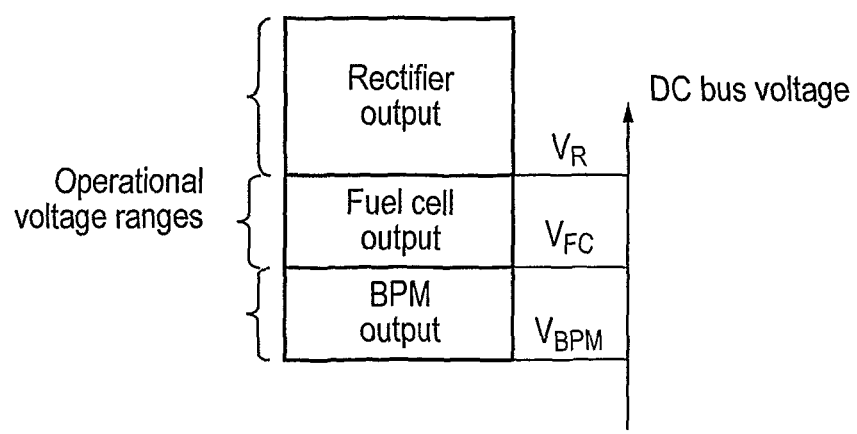
FIG. 13 is a diagram illustrating the priority protocol for power supply to the DC bus.

FIG. 13 is a schematic view of a prioritised source selection scheme for the DC bus used in the apparatus according to the invention. In this embodiment the source selection scheme is arranged to ensure that power is provided to the DC bus from one of the following source in the following order of preference: (i) rectifiers sourcing from the primary power source; (ii) fuel cells; (iii) bridge power module. Thus, the secondary power source is arranged to transfer power to the DC bus whenever the bus needs more energy that is offered by the rectifiers (which could be zero in case of an outage). The BPM kicks out as soon as the fuel cells have started to produce nominal power thereby elevating the voltage to the level preset for the fuel cell DC/DC converters. The preset output voltage, which dictates the priority of a given source, may be individually programmable to permit the priority scheme to be adjustable.

The prioritised source selection scheme is implemented by segregating the DC Bus voltage into specific voltage ranges as shown in FIG. 13, such that the rectifiers are set to deliver VR to the DC bus, the fuel cells is set to deliver VFC<VR to the DC bus and the BPM is set to deliver VBPM<VFC to the DC bus. In this way, the built-in voltage control of any source will reduce its output power (current) to zero whenever the bus voltage is higher than its own voltage (according to its built-in I-V-characteristics). Consequently, the units with the highest output voltage class will take over the whole supply of power.

In case a source cannot fulfill the total power demand, the voltage will drop to the next level priority class and elements from this class will add the amount of power needed to cope with the demand (i.e. a kind of load sharing).

A soft output I-V-characteristics will support the paralleling of several outputs on the DC bus (using a classic Droop or P-control principle).

The prioritised source selection scheme may be implemented in other ways. For example, each source may provide a certain output voltage and the outputs may be feed through a serial diode thereby creating a wired-OR function, where the source with the highest voltage set point takes it all. Alternatively, a voltage measurement circuit may be provided which programmes the output current limiter of each converter depending on the DC bus voltage. In a further alternative, the prioritised source selection scheme may be implement by centralised module control, e.g. via the control unit, to dictate operation to each module.

According to the prioritised source selection scheme the output power based on the actual DC Bus voltage can be autonomously controlled. In particular, the fuel cells and BPM may operate autonomously based on the actual DC Bus voltage to start or stop and to control the output power during operation.

One aspect of the controllability of the invention may be provided by the switch unit which selectively connects the load bars to the primary power source. The switch unit may automatically monitor the status of the primary power source and disconnect the load bars therefrom in case of detecting a grid outage (e.g. zero voltage from primary power source). Furthermore the switch unit may assist with synchronisation of the AC signals output by PCMs operating as inverters. For example, the switch unit may monitor an AC supply from the primary power source and generate a synchronisation signal therefrom. If there is a grid outage, the switch unit may create independently a master synchronisation signal. When the grid becomes active again, the switch unit may adapt the master synchronisation signal (e.g. by moving its phase) to prepare for re-connecting to the grid.

Conventional synchronisation techniques may be used to implement the above functions. However, synchronisation may not be essential to the operation of the invention.

The control unit mentioned above may be a centralised configuration module arranged to communicate directions to each other module via a CAN bus or the like. The PCMs may be arranged to operate autonomously within a given state, i.e. the configuration module may instruct operation in rectifier mode or inverter mode and control which load bar is sourced or served, but the active control of the module in the state is controlled by a individual control unit.

All modules may communicate with the configuration module to provide information about the system status and operation. The configuration module may thus store information about availability status, system diagnostics and fault prediction.

The apparatus may include a user interface arranged to permit input of instructions to and extraction of information from the configuration module. The user interface may be a standard console like a PC, on which the configuration module is accessible electronically e.g. via a WEB interface. The user interface may offer functions such as
    monitoring of key parameters
    alerts in case of faults
    statistics, storage and presentation of log data, analyses etc.
    defining the system and setting the specific system requirements (like initialising different zones and their availability/priority)
    initialising and enabling different dynamic functions such as on-the-fly reconfiguration, fault response, energy-related functions (such as peak shaving, or other energy saving functions)
    the performance of tests (test of modules, test run of power sources).

The PCMs can by themselves detect if the primary power source is available or not on the load bars. Their individual control units may determine the module configuration from that detection e.g. based on a system configuration set by the configuration module.

In one embodiment the PCMs may be arranged to detect if the primary power source is available on a load bar by connecting to that load bar in the inverter mode but with an output frequency set higher than the frequency of the primary power source whereby the PCM acts to move the frequency higher than the frequency of the primary power source. If the primary power source is present, it will force the frequency on the load bar to be identical to it. If it is not present, the frequency will slide to a value outside the normal frequency range. By detecting a frequency on the load bar all modules may detect from the frequency if the primary power source is present or not.

In another embodiment, the switch unit may detect if the primary power source is active (e.g. present above a nominal condition). The result may be provided via the communication bus to all modules inside the apparatus. The result may also include information on which state the switch unit is in.

In yet another embodiment, an AC signal ("pilot signal") at a given frequency (with or without digital coding to allow for a lower amplitude and more reliable detection) may be applied to the output from the primary power source by the switch unit. The modules inside the apparatus can recognize the pilot signal and thus detect, whether or not the grid is connected to the load bar. This latter method does not detect if the grid above a nominal value or not; it merely checks if the load bar is connected to the primary power source or not.

Figure 14:
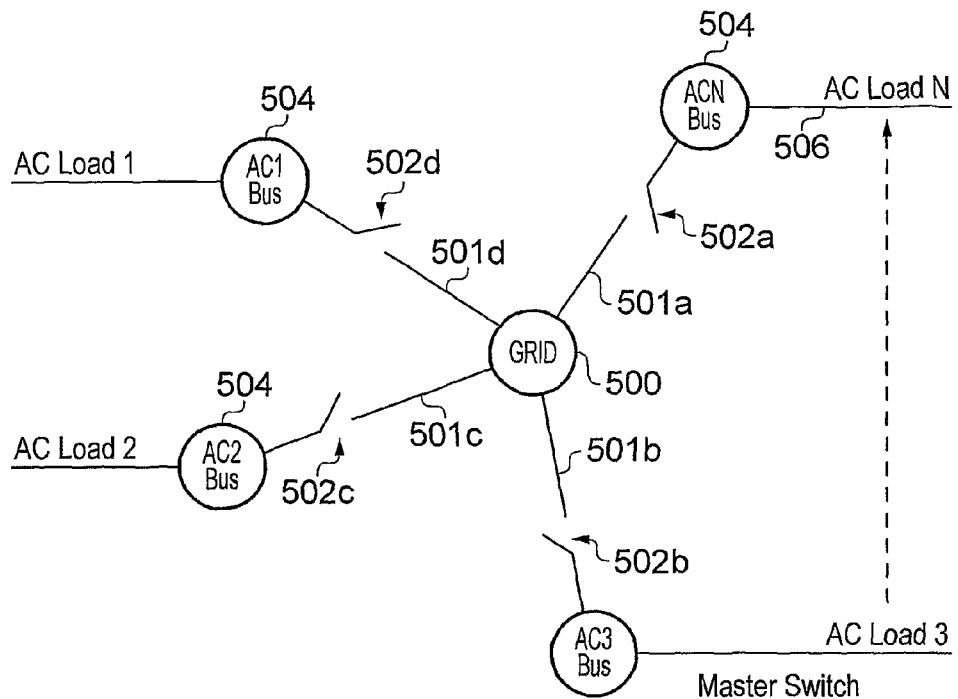
FIG. 14 is a schematic view of a master switch unit connectable to more than two load bars.

FIG. 14 is a schematic view of a switch unit arranged to selectively connect more than two load bars 504 to a primary power source, in this case grid 500. The switch unit comprises a plurality of signal lines 501a, 501b, 501c, 501d, each of which connect the grid 500 independently to a respective load bar 504 via respective switches 502a, 502b, 502c, 502d. The load bars 504 each have output signal lines 506 for connecting the load bars 504 to a destination.

Figure 15:
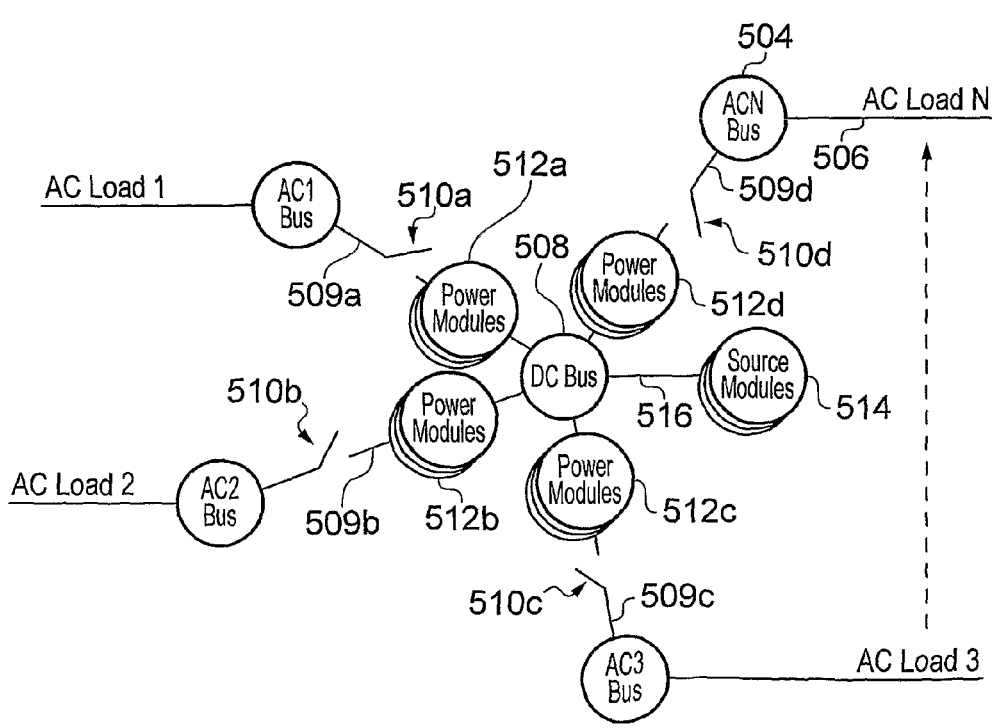
FIG. 15 is a schematic view of the connectivity between a DC bus and more than two load bars.

FIG. 15 shows the connectivity between the load bars 504 and a DC bus 508 in an arrangement where there are more than two load bars. Each load bar 504 is selectively connectable to the DC bus 508 by a respective signal line 500a, 500b, 500c, 500d via one or more power conversion modules 512a, 512b, 512c, 512d. A switch 510a, 510b, 510c, 510d is provided on each signal line between the load bar 504 and the power conversion modules 512a, 512b, 512c, 512d. The secondary power source 514 is connected to the DC bus 508 via a separate signal line 516.

The invention claimed is:

1. An emergency power supply apparatus comprising:
   a plurality of load bars conveying power to a load, each of the plurality of load bars being independently connectable in parallel to a primary power source via a switch unit, which selectively connects one or more of the plurality of load bars to the primary power source;
   a DC bus arranged to receive DC power from a secondary power source;
   a plurality of bi-directional power conversion modules, each bi-directional power conversion module comprising either a rectifier element and an inverter element or a bi-directional converter and being activatable to form a connection between the DC bus and a respective load bar and each activated bi-directional power conversion module being selectively configurable in use to switch between:
      a rectifier mode for transferring power from the respective load bar to the DC bus; and
      an inverter mode for transferring power from the DC bus to the respective load bar; and
   a controller in communication with the bi-directional power conversion modules to set a power transfer direction between each load bar and the DC bus thereby to control an operational state for each load bar.

2. The apparatus according to claim 1, wherein the plurality of power conversion module is configurable by the controller to switch each load bar between the following operational states:
   DC bus feed, in which when the primary power source is active a power conversion module acts to transfer power from its respective load bar to the DC bus;
   AC export, in which when the primary power source is inactive a power conversion module acts to transfer power from the DC bus to its respective load bar for export from the apparatus;
   critical (no break) AC feed, in which a power conversion module acts to transfer unbroken power from the DC bus to its respective load bar at all times; and
   urgent (minimal break) AC feed, in which when the primary power source is active power is fed from it directly to a respective load bar, which is connected directly to the load, but when the primary power source is inactive a power conversion module acts to transfer power to the respective load bar from the DC bus.

3. The apparatus according to claim 1, wherein a plurality of power conversion modules are connected to a common load bar of the plurality of load bars, and
   wherein each of the activated power conversion modules connected to that common load bar occupy the same operating mode.

4. The apparatus according to claim 1, wherein the load bar to which each power conversion module is connected and/or the operating mode of each power conversion module is selectable.

5. The apparatus according to claim 2 arranged to detect the status of the primary power source, wherein the operational states of the load bars are controlled based on the detected status.

6. The apparatus according to claim 5, wherein the primary power source is an AC source and wherein at least one of:
   the switch unit applies a detection signal to a power signal from the primary power source, and the power conversion modules are arranged to recognize the detection signal to determine whether or not power from the primary power source is present on the load bar; or
   the power conversion modules connected to a load bar occupying the urgent (minimal break) state are arranged to operate as an inverter to move the frequency of the load bar above the frequency of the power signal from the primary power source, and the power conversion modules are arranged to detect the frequency on the load bar to determine whether or not power from the primary power source is present on the load bar.

7. The apparatus according to claim 1, wherein the secondary power source includes a DC generator, such an a fuel cell generator or photovoltaic cell, and a bridge power module arranged to maintain the voltage of the DC bus in the event of a power outage at the primary power source.

8. The apparatus according to claim 7, wherein one or more power control modules operating in the rectifier mode, the DC generator and the bridge power module are arranged to provide power to the DC bus autonomously according to a priority protocol.

9. The apparatus according to claim 1, wherein the load is partitioned into a plurality of zones and each load bar is connectable to each zone, whereby the power capacity and/or availability at each zone is selectively controllable.

10. An extended run generator for providing back up power to an uninterruptible power supply for critical loads in a destination in the event of a mains outage, the generator comprising:
    a secondary power source; and
    emergency power supply apparatus according to claim 2, in which:
    the DC bus is connected to receive power from the secondary power source, and
    a first load bar occupying the urgent (minimal break) AC feed state, which, in the event of a mains outage, is connected by one or more power conversion modules to transfer power from the DC bus the uninterruptible power supply.

11. An uninterruptible power supply (UPS) for providing unbroken power to critical loads in a destination in the event of a mains outage, the UPS comprising:
    a secondary power source; and
    emergency power supply apparatus according to claim 2, in which:
    the DC bus is connected to receive power from the secondary power source,
    a first load bar is connected via the switch unit to the mains and connected by one or more power conversion modules to transfer power to the DC bus, and
    a second load bar is connected by one or more power conversion modules to receive power from the DC bus for powering the critical loads.

12. A method of testing and initializing a power conversion module in emergency power supply apparatus according to claim 2, the method comprising:
    connecting the power conversion module between the DC bus and a first load bar which occupies the urgent (minimal break) AC feed state;
    activating the power conversion module in the rectifier mode to deliver power from the first load bar to the DC bus;
    checking if the power conversion module operates normally;
        wherein if operation is normal the method includes:
            deactivating the power conversion module;
            reconfiguring it to connect the DC bus and a second load bar which occupies the critical (no break) AC feed state; and
            after reconfiguring, activating the power conversion module in the inverter mode to deliver power from the DC bus to the second load bar.

13. A method of reconfiguring an emergency power supply apparatus according to claim 1, the method comprising the steps of:
    deactivating an active power conversion module connected between a first load bar and the DC bus;
    after deactivation, disconnecting the power conversion module from the first load bar and connecting it to a second load bar; and
    activating the power conversion module in a mode determined based on the operational state of the second load bar.

14. The emergency power supply apparatus of claim 1, wherein the plurality of bi-directional power conversion modules includes one or more bi-directional power conversion modules that are selectively operable in a DC/DC conversion mode for converting between DC power on the respective load bar and the DC bus.

\* \* \* \* \*